April 15, 1924.
F. PORSCHE
BRAKE FOR POWER DRIVEN VEHICLES
Filed March 21, 1923
1,490,850
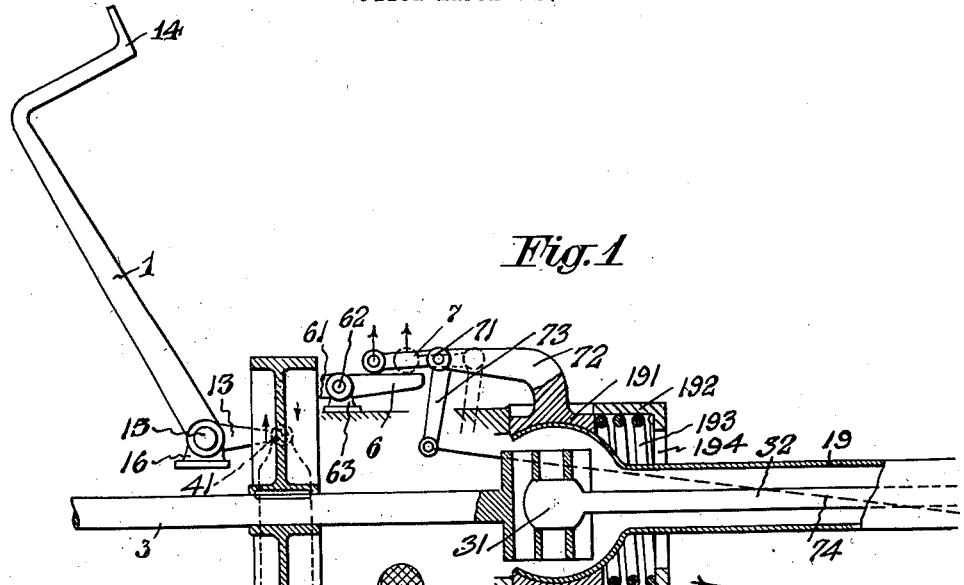
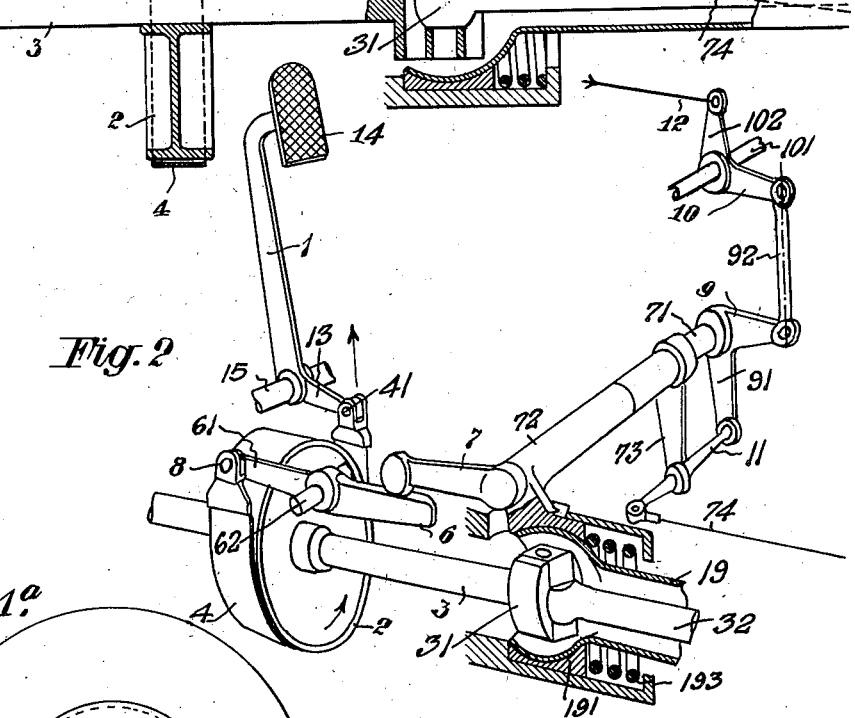
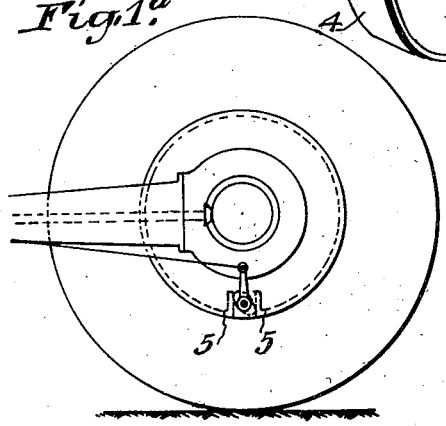
Inventor:
F. Porsche Patented Apr. 15, 1924.

1,490,850

UNITED STATES PATENT OFFICE.

FERDINAND PORSCHE, OF WIENER-NEUSTADT, AUSTRIA.

BRAKE FOR POWER-DRIVEN VEHICLES.

Application filed March 21, 1923. Serial No. 626,693.

*To all whom it may concern:*

Be it known that I, FERDINAND PORSCHE, a citizen of the Republic of Czechoslovakia, residing at Wiener-Neustadt, Austria, have invented Improvements in and Relating to Brakes for Power-Driven Vehicles, of which the following is a specification.

This invention relates to brakes for power driven vehicles of the class in which the power exerted to apply the brakes is partly derived from a rotating member driven by the moving vehicle.

One object of the invention is to provide means for automatically adjusting the braking pressure so that the most effective braking action will always be obtained at any speed at which the vehicle may be travelling and notwithstanding the kind of track over which the vehicle is passing when the brakes are applied.

A further object of the invention is to provide means for preventing locking of the wheels taking place owing to the employment of excessive braking pressure.

With the above objects in view the invention consists in the novel combination of parts and details of constructions hereinafter fully described and illustrated in the accompanying drawings forming part of this specification.

In the drawings, Figure 1 is a part longitudinal section of an automobile chassis showing an embodiment of the invention. Figure 1ª shows a rear wheel and brake rigging therefor, and Figure 2 is a perspective view of an embodiment of the invention for operating both front and rear wheel brakes.

Referring to Fig. 1, a brake drum 2 is keyed to the shaft 3 which is driven by the engine or motor in any well-known manner and drives the rear wheels of the vehicle through the intermediary of a universal joint 31, the Cardan shaft 32 and a differential gear (not shown). An elastic brake band 4 partly encircles the brake drum 2, one end of the said band being pivoted at 41 to the short arm 13 of a bell crank lever 1, the long arm of which is provided with a footplate 14. The lever 1 is fixed on a shaft 15 which is journalled in bearings 16, only one of which is shown in the drawing. The bearings 16 are mounted on a transverse member of the vehicle frame. The other end of the band 4 is pivoted at 8 to one arm 61 of a rocker lever 6 which is pivoted on the shaft 62. This shaft 62 is mounted between bearings 63 which are fixed to the frame of the vehicle or on a member attached to the frame.

The band 4, the drum 2 and the lever 6 are carried by the frame of the vehicle or on members which are connected to the frame. These members are therefore capable of being longitudinally displaced together with the frame relatively to the Cardan shaft casing 19, rear axle and the rear wheels.

A lever 7 fixed on a transverse shaft 71 bears on the arm of the rocker lever 6 remote from the band 4. The shaft 71 is journalled in a bearing bracket 72 provided on the ball socket 191 of the swivelling joint which connects the Cardan shaft casing 19 to the frame of the vehicle. The ball socket 191 is housed in a casing 192 which is fixed to the frame of the vehicle. Th ocket 191 is capable of a limited amount of ongitudinal motion within the casing 192 against the action of a spring 193 interposed between the rear of the ball socket and the inner face of the rear wall of the casing 192 which is provided with an opening 194 through which the Cardan shaft casing 19 passes. The shaft 71 also carries a lever 73 which is fixed to it. The free end of the lever 73 has connected to it a pull member 74, the said pull member in the construction shown consisting of a flexible cable, by means of which the brakes are applied to the rear driving wheels.

The strength of the spring 193 is such that it yields when the frictional force acting between the rear driving wheels and the track approaches the value $G\mu$, in which $G$ is the weight of the vehicle and $\mu$ the coefficient of sliding friction of the wheel tyre on the track. By this means the frame and body of the vehicle will move longitudinally relatively to the rear axle and driving wheels, compressing the spring 193 in doing so, when the brakes are applied with sufficient force to render it possible for the wheels to lock.

The operation of the mechanism described above is as follows: When the brakes are to be applied the driver depresses the lever 1 which causes the short arm 13 to move upwards in an anticlockwise direction thereby applying the brake band 4 to the rotating drum 2. On continuing to depress the lever 1 the rocker lever 6 is turned also in an anticlockwise direction, this action being assisted by the action of the rotating drum 2 which is in frictional contact with the band 4, this motion of the rocker lever 6 in turn raising the lever 7, whereby the lever 73 is rotated clockwise and applies the rear brakes by means of the member 74. Should the force with which the brakes are applied to the rear wheels approach that which would cause the rear wheels to lock, that is to say to be prevented from rotating at all, the frictional force acting between the rear wheels and the track will approach that due to pure sliding motion of the tyre on the track, the spring 193 will yield, and the body and frame of the vehicle will move relatively to the Cardan shaft casing 19 and the rear wheels. By this means the lever 7 will be displaced from the position shown in full lines in Figure 1 to that shown in broken lines, and the lever 7 will bear on the rocker lever 6 at a point further away from the shaft 62 thereby altering the leverage of the brake rigging and reducing the braking force. It will thus be seen that locking of the rear wheels is prevented owing to the automatic displacement of the vehicle frame and the portion of the brake rigging mounted thereon relatively to the rear wheels, rear axle, Cardan shaft, Cardan shaft casing and the portion of the brake rigging associated with the said casing.

In the embodiment shown in Fig. 2, means are provided for operating brakes on both the front and rear road wheels of the vehicle, the construction and operation of this construction however being otherwise the same as that of the embodiment of the invention shown in Fig. 1. In this case the pull member 74 for operating the rear wheel brakes is not directly attached to the lever 73 but to one arm of a rocker lever 11 which is pivoted at the free end of said lever. The other arm of the rocker 11 is pivotally connected to the dependent arm 91 of a bell crank lever 9, the other arm of which is connected by means of a pull member 92 to one arm of a bell crank lever 10. The lever 10 is rotatably mounted on a shaft 101 and operates the front wheel brakes by means of the pull member 12 which is connected to its arm 102. The member 11 acts as an equalizing member as between the front and rear brakes so as to ensure that the braking force applied to the front wheels will be equal to that applied to the rear wheels, thereby avoiding the possibility of the front wheels becoming locked in consequence of the braking pressure applied thereto being greater than the maximum pressure which can be applied to the rear wheels without causing a relative movement of the lever 7 with respect to the lever 6.

The mechanism hereinbefore described renders it possible to obtain the best action of the brakes at any speed and on any track without any considerable expenditure of force and without a special attention on the part of the driver, and will always prevent locking of the wheels, since even in the case where the brakes are jammed on the limit of the braking pressure below which locking of the wheels takes place will never be exceeded.

What I claim, is:

1. In a power driven vehicle, the combination of means operable by the driver of the vehicle for applying the brakes to the running wheels of the vehicle, a moving member intended to co-operate with said brake applying means for supplying part of the braking force, and means interposed between the moving member and the brakes for limiting the braking pressure.

2. In a power driven vehicle having road wheels and a frame capable of longitudinal displacement relatively to the road wheels of the vehicle intended to be braked and the members for connecting said road wheels to the vehicle, the combination of means operable by the driver of the vehicle for applying the brakes to the road wheels, a moving member intended to co-operate with said brake applying means for supplying part of the braking force, brake rigging provided for the said road wheels, a member provided on the vehicle frame for transmitting the movement of the brake applying means to said brake rigging with a leverage which diminishes in accordance with the amount of displacement of the vehicle frame relatively to the road wheels and means interposed between one of said members for connecting the road wheels to the vehicle frame and the vehicle frame for opposing the longitudinal displacement of the latter to the former, said means being capable of yielding in response to the extent of movement of the vehicle frame relative to the wheels.

3. In a power driven vehicle, the combination of a brake lever operable by the driver for applying the brakes to the road wheels, a moving member driven by the vehicle for supplying a part of the braking force, a brake applying member connected to said brake lever, said brake applying member being intended to co-operate with said moving member, an intermediate brake operating lever and a transmission member for transmitting the motion of the brake applying member to the said intermediate lever, said transmission member being displaceable relatively to said intermediate lever for the purpose of varying the leverage and thereby the force with which the brakes are applied.

4. In a power driven vehicle having road wheels and a frame capable of longitudinal displacement relatively to the road wheels of the vehicle intended to be braked and the members for connecting said road wheels to the vehicle, the combination of a brake lever intended to be operated by the driver, a rotating shaft driven by the driving motor of the vehicle, a drum provided on said shaft, a brake band connected up at one end to said lever and capable of being brought into frictional engagement with said drum and a double-armed rocker lever having one arm connected up to the other end of said brake band, said brake lever, shaft, drum, brake band and rocker lever all provided on the frame of the vehicle, brake rigging provided for the road wheels, said brake rigging including an intermediate brake lever actuable by said rocker lever and a spring for resisting the longitudinal displacement of the vehicle frame relatively to the road wheels and the members for connecting the road wheels to the vehicle frame.

5. In a power driven vehicle having road wheels and a frame capable of longitudinal displacement relatively to the road wheels of the vehicle intended to be braked and the members for connecting said road wheels to the vehicle including a Cardan shaft casing and a swivelling joint for connecting the Cardan shaft casing to the vehicle frame, the combination of a brake lever intended to be operated by the driver, a rotating shaft driven by the driving motor of the vehicle, a drum provided on said shaft, a brake band connected up at one end to said lever and capable of being brought into frictional engagement with said drum and a double-armed rocker lever having one arm connected up to the other end of said brake band, said brake lever, shaft, drum, brake band and rocker lever all provided on the frame of the vehicle, a rock shaft provided on said swivelling joint, an intermediate brake lever provided on said rock shaft, said lever being intended to bear on said rocker lever, brake rigging for applying the brakes to the front and rear wheels of the vehicle, means for equalizing the braking forces applied to the front and rear wheels, and a spring for resisting the longitudinal displacement of the vehicle frame relatively to the road wheels and the members for connecting the road wheels to the vehicle frame.

In witness whereof I have hereunto signed my name in the presence of two subscribing witnesses.

FERDINAND PORSCHE.

Witnesses:
    JNO. RECK,
    CARL WURTENBERG.